United States Patent Office
3,453,098
Patented July 1, 1969

3,453,098
FERTILIZER CONTAINING BIURET FREE
OF CYANATE IONS
Jonas Kamlet, deceased, late of New York, N.Y., by Edna
Y. Kamlet, executrix, 300 Park Ave. S., New York,
N.Y. 10010
No Drawing. Filed Feb. 24, 1966, Ser. No. 531,015
Int. Cl. C05c 13/00; C07c 127/24
U.S. Cl. 71—30                              5 Claims

ABSTRACT OF THE DISCLOSURE

The preparation of a biuret product substantially free of cyanate ions by heating urea between about 120° and 205° C. to effect autocondensation, dissolving the reaction product mixture in boiling water, cooling the resulting solution to obtain the desired biuret product as a precipitate. Slow release nitrogenous fertilizers containing the biuret product are disclosed and claimed.

---

This invention relates to nitrogenous fertilizers and to a process for preparing the same. More particularly, it relates to nitrogenous fertilizers which render their plant-assimilable nitrogen contents available at a uniform rate and over a prolonged period of time, and to the process of preparing the same. Many crops, especially those with high nitrogen requirements, necessitate several applications of fertilizer over the course of the growing season. Since a single application of the entire season's requirement of the nitrogenous fertilizer will usually cause "burning" and extensive damage or destruction of the crop, it is often necessary to supply this nitrogen requirement by several incremental applications. It is the purpose of this invention to provide a "depot" nitrogenous fertilizer which will release its plant-assimilable nitrogen over a prolonged period of time, so that the entire growing season's requirements of the fertilizer may safely be supplied in one or two applications, without damage to the crop. This will permit a considerable saving in labor, equipment and storage facilities.

In United States Patent No. 2,768,895, issued to Jonas Kamlet on Oct. 30, 1956, the use of urea autocondensation products as a nitrogenous fertilizer is disclosed. The term "urea autocondensation products" as used in United States Patent No. 2,768,895 and in the present application refers to a mixture of biuret, triuret, tetrauret, pentauret, cyanuric acid, ammelid, ammonium cyanate and ammeline, with biuret being the major component of said mixture, obtained by the autocondensation of urea. As set forth in the Kamlet patent, when urea is heated, in the absence of catalysts, at a temperature between 120° C. and 205° C., atmospheric, subatmospheric or superatmospheric pressures, a series of autocondensation reactions occur, with the elimination of gaseous ammonia. The major product formed by those autocondensation reactions is biuret, M.P. 190°–193° C.

(a) $2NH_2CONH_2 \rightarrow NH_2CONHCONH_2 + NH_3$. Other autocondensation products formed in amounts varying from traces to several percentages in the above reaction are:

(b) Triuet, M.P. 231° C.;

$3NH_2CONH_2 \rightarrow NH_2CONHCONHCONH_2 + 2NH_3$ (c) Tetrauret, M.P. 186° C.;

$4NH_2CONH_2 \rightarrow NH_2CONHCONHCONHCONH_2 + 3NH_3$ (d) Pentauret, M.P. 235° C.;

$5NH_2CONH_2 \rightarrow$
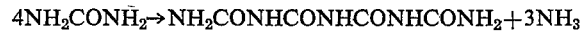

(e) Cyanuric acid, M.P. 360°–370° C. (decomp.);

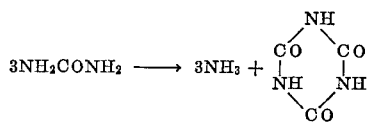

(f) Ammelid, M.P. 170°–175° C. (decomp.);

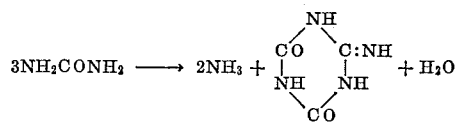

(g) Ammonium cyanate, M.P. 80°–81° C. (decomp.);

$NH_2CONH_2 \rightarrow NH_4CNO$ (h) Ammeline, M.P. 200°–210° C. (decomp.);

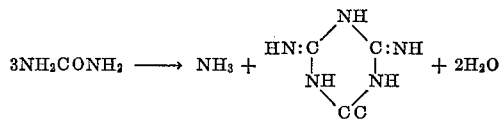

The product obtained by heating urea at a temperature between 120° C. and 205° C., at atmospheric, subatmospheric or superatmospheric pressures, was found to contain 20% to 70% of urea autocondensation products (as defined above), the remaining 70% to 30% being unreacted urea (depending on the method used to effect the autocondensation reaction). This mixture was used directly, without further treatment, as a nitrogenous depot fertilizer, combining the rapidly absorbed, soluble urea with the slowly absorbed, relatively insoluble, autocondensation products of urea.

It was further found that the urea autocondensation products described above were hydrolyzed substantially quantitatively in the soil and utimately yield their entire nitrogen content in the form of ammonia, which then became available to the nitrifying bacteria in the soil, and finally to the growing plant. Because of the low solubility in water, these urea autocondensation products yielded their assimilable nitrogen at a constant and uniform rate over a prolonged period of time, and thus served as a continuing source of nitrogenous plant feed over this period. These urea autocondensation products are, therefore, ideally suited for use as slowly assimilated depot nitrogenous fertilizers for growing plants.

Although with some crops such as corn the use of the urea autocondensation products proved to be an excellent fertilizer, with many other crops serious phytotoxic manifestations were encountered. This toxicity was attributed to biuret, the main component of the urea autocondensation products; and, consequently, the interest in urea autocondensation products as a depot fertilizer diminished considerably. However, the many excellent properties of the urea autocondensation products as a prolonged activity fertilizer have provided the incentives for additional work in an effort to eliminate the aforementioned toxic manifestations.

One object of this invention, as discussed above, is to provide a depot nitrogenous fertilizer which will release its plant-assimilable nitrogen over a prolonged period of time.

Another object of this invention is to provide a depot nitrogenous fertilizer comprising urea autocondensation products, which no longer exhibit the toxic manifestations previously associated with the use of such products.

A further object of this invention is to provide a method for removing the toxic component from urea autocondensation products.

A still further object of this invention is to provide a simple and inexpensive process for the manufacture of such a slowly-absorbed, uniformly assimilated depot nitrogenous fertilizer, using the cheap and readily available industrial chemical urea as a starting material, and yielding by-products which may readily be recycled in the urea manufacturing process, and thereby reduce the cost of preparing the new fertilizer.

These and other objects of the present invention will become readily apparent from the ensuing description and illustrative embodiments.

In accordance with the present invention it has now been found that the phytotoxic properties of the urea condensation products can be eliminated by dissolving the urea autocondensation products in boiling water, i.e., water at a temperature of 100° C., and then cooling to precipitate or recrystallize the biuret product. The precipitated product was found to contain no less than 95%, and preferably from about 97 to 99%, by weight of biuret as well as trace amounts of urea, cyanuric acid triuret, and water. The latter components generally do not comprise more than about 1% by weight each, and generally are present in amounts which are less than 0.5% each.

The biuret product thus produced was found to exhibit none of the phytotoxity properties heretofore associated with the use of the aforedescribed urea autocondensation products. The improved results are attributed to the complete removal of ammonium cyanate, one of the by-products formed in the preparation of the urea autocondensation products as described above, from the biuret. The phytotoxicity which had been previously attributed to biuret has actually been shown to be due to the presence of the ammonium cyanate by-product in the urea autocondensation products. The absence of the cyanate ion from the biuret product prepared in accordance with the method of this invention permits the biuret product to be employed effectively as a slowly absorbed, depot fertilizer without encountering any undesirable side effects. As described below, this biuret product may be employed either by itself as a fertilizer or in combination with rapidly-available nitrogenous fertilizers such as urea, ammonium sulfate, ammonium nitrate, and the like.

Although it is possible to remove the ammonium cyanate from the urea autocondensation products with solvents other than boiling water, and the use of other solvents such as organic solvents is contemplated herein, the use of boiling water is especially preferred. This solvent not only substantially eliminates ammonium cyanate contamination, but also provides the opportunity to utilize a continuous process wherein the solvent liquor together with the dissolved urea and the soluble urea autocondensation products can be recycled to the process to make more of the desired biuret product. This aspect of the invention and the advantages achieved thereby will be described in greater detail in conjunction with the description of the overall process for preparing the biuret product of this invention.

In general, the process of this invention comprises heating urea between about 120° C. and 205° C., at atmospheric, subatmospheric or superatmospheric pressures. The resulting reaction product mixture will contain from about 30 to 70% of urea autocondensation products (as defined above), the remaining 30 to 70% being unreacted urea. The reaction product mixture is then dissolved in boiling water, cooled to a temperature at which biuret will precipitate, and then filtered to recover a cyanate ion-free biuret product containing minor amounts of urea, cyanuric acid, and triuet. The biuret product is completely free of ammonium cyanate. The filtrate, on the other hand, contains appreciable quantities of the unreacted urea, the ammonium cyanate, and other soluble components of the initially prepared urea autocondensation products.

In accordance with one feature of the present invention, the filtrate is evaporated to dryness under reduced pressure and at a temperature within the range of about 50° to 60° C. The residue is mixed with fresh urea, e.g., two moles of urea are added for each mole of biuret recovered in the precipitate, and the resulting admixture recycled to the urea autocondensation step. It is also possible to add the urea to the filtrate prior to the drying step, and such a procedure is generally preferred. One additional advantage of the process of this invention resides in the discovery that the ammonium cyanate in the filtrate is at least partially converted to urea in the autocondensation step. The cyanuric acid is also recycled. Although some cyanuric acid may precipitate with the biuret, there is no evidence that the cyanuric acid traces are toxic to plants. The ability to recycle to the autocondensation step substantially all of the non-biuret components of the reaction product mixture obviously has important economic advantages.

The above described process for the manufacture of a biuret-containing nitrogenuous fertilizer is ideally suited for operation in conjunction with a plant for the manufacture of urea by the high pressure reaction of ammonia and carbon dioxide. The ammonia gas evolved during the autocondensation reaction of the urea may be piped off and returned to the urea process by being fed to the ammonia compressors.

As previously set forth, the biuret product of this invention may be used as such or in combination with an inexpensive source of readily soluble, instantly available plant-assimilable nitrogen. The latter, for example, include ammonium sulfate, ammonium, nitrate, potassium nitrate, urea, and the like. In general, the cyanate ion-free biuret will comprise about 25 to 75%, and preferably about 33 to 67%, by weight, based on the total weight of the fertilizer composition.

The following examples and test results are given to define and to illustrate this invention, but in no way to limit it to reagents, proportions, conditions, applications or to imply that all results obtained will be identical to those described herein. Obvious modifications will occur to any person skilled in the art.

Urea was heated in the absence of a catalyst at a temperature of 145–152° C. and under a pressure of 12–18 mm. Hg for nine hours. The resulting reaction product mixture was dissolved in boiling water, which was then cooled to a temperature below the melting point of biuret to obtain a biuret precipitate. The precipitate was recovered by filtration, and the product constituted a 48% yield of biuret having the following composition:

| | Weight percent |
|---|---|
| Biuret | 98.2 |
| Urea | 0.42 |
| Cyanuric acid | 0.28 |
| Water | 0.41 |
| Triuret | 0.38 |
| Ammonium cyanate | None |

In accordance with another feature of this invention, the aqueous filtrate recovered from the biuret precipitation was evaporated to dryness under reduced pressure and a temperature of 50–60° C. The resulting residue was admixed with fresh urea, and the initial fusion step was repeated. The overall yields of biuret, obtained after the first cycle, were as follows:

| | Percent |
|---|---|
| 2nd cycle | 79 |
| 3rd cycle | 89 |
| 4th cycle | 92 |
| 5th cycle | 92 |

Utilizing the biuret product obtained during the first cycle (hereinafter identified as the "biuret"), a series of greenhouse pot experiments were conducted to evaluate this product by itself and in admixtures with rapid-release nitrogenous fertilizers. In order to provide conditions for optimum response to added nitrogenous fertilizers, the test grasses were grown in a loamy soil having a pH of 4.5. Four sources of a perennial ryegrass were mixed and these seeds were chosen as indicator plants since the grass has a high nitrogen requirement and may be cropped at frequent intervals without excessive shock.

The seeds were sown in 2 gallon pots; the surface of each pot was about 1 sq. ft. in area; the contents of each pot weighed about 20 lbs. Basic treatment consisted of the addition of 50 g. of a good garden soil as an inoculant for nitrifying bacteria and as a source for the necessary trace elements, in addition to 2.5 g. dolomite (100 mesh) 3.0 g. of $P_2O_5$ (as superphosphate) and 1.2 g. of $K_2O$ (as potassium sulfate) per pot. These materials were mixed throughout the loamy soil in the pot and the grass seeds were planted at the rate of 500 seeds per pot, and allowed to grow for nine months without addition of nitrogenous fertilizers. At the conclusion of this preliminary growing period, all grass tops exceeding 1½" in height were clipped and discarded. This preliminary treatment largely removes nitrogen sources originally present in the soil and the inoculum. The nitrogenous fertilizers being tested were then applied as surface treatments at the rate of 200 lbs. N per acre (2.08 g. N/sq. ft.) and 400 lbs. N per acre (4.16 g. N/sq. ft.). The plant tops were then cropped at two month intervals, with the harvested portions of the tops being dried, weighed and analyzed for total nitrogen content. The experiments were terminated after a growth period of ten months, at the end of which time the crowns and roots were recovered and similarly analyzed. The results obtained are summarized in the following table. All biuret, ⅓ biuret and ⅔ $NH_4NO_3$, ⅔ biuret and ⅓ $NH_4NO_3$, ⅓ biuret and ⅔ $(NH_4)_2SO_4$, ⅔ biuret and ⅓ $(NH_4)_2SO_4$, were used as the nitrogen sources. In the table the first line represents the nitrogen content of the harvested material, and the second line represents the total nitrogen recovered in milligrams.

| Nitrogen source | 2-month harvest | 4-month harvest | 6-month harvest | 8-month harvest | 10-month harvest | Roots and crowns | Total nitrogen recovered, mg: |
|---|---|---|---|---|---|---|---|
| None | 2.7% | 2.8% | 2.4% | 2.1% | 2.3% | 1.0% | |
|  | 62.4 | 31.6 | 30.4 | 31.8 | 34.6 | 119.7 | 310.5 |
| 200 LBS. NITROGEN PER ACRE | | | | | | | |
| ⅓ Biuret | 3.6% | 3.8% | 3.1% | 3.0% | 3.1% | 2.1% | |
| ⅔ Urea | 124.6 | 126.8 | 100.4 | 79.6 | 80.4 | 299.4 | 802.2 |
| ⅔ Biuret | 3.7% | 3.9% | 3.4% | 3.4% | 3.6% | 2.8% | |
| ⅓ Urea | 130.4 | 124.0 | 107.8 | 90.8 | 81.6 | 320.4 | 855.0 |
| ⅓ Biuret | 3.4% | 3.4% | 3.0% | 2.9% | 3.2% | 2.8% | |
| ⅔ $NH_4NO_3$ | 118.6 | 117.9 | 118.6 | 84.0 | 78.4 | 299.0 | 816.5 |
| ⅔ Biuret | 3.7% | 3.6% | 3.2% | 3.6% | 3.4% | 2.3% | |
| ⅓ $NH_4NO_3$ | 120.4 | 111.0 | 116.4 | 90.0 | 73.0 | 310.2 | 812.0 |
| ⅓ Biuret | 3.1% | 3.7% | 3.4% | 3.4% | 3.1% | 2.8% | |
| ⅔ $(NH_4)_2SO_4$ | 108.4 | 112.4 | 119.0 | 90.2 | 80.0 | 285.2 | 795.2 |
| ⅔ Biuret | 3.6% | 3.4% | 3.6% | 3.7% | 3.5% | 2.4% | |
| ⅓ $(NH_4)_2SO_4$ | 120.4 | 112.6 | 120.0 | 104.2 | 88.0 | 300.2 | 845.4 |
| All Biuret | 2.9% | 3.5% | 3.8% | 3.8% | 3.4% | 2.9% | |
|  | 90.2 | 130.4 | 131.6 | 130.2 | 109.0 | 268.6 | 860.0 |
| 400 LBS. NITROGEN PER ACRE | | | | | | | |
| ⅓ Biuret | 4.2% | 4.7% | 4.6% | 4.5% | 4.1% | 2.5% | |
| ⅔ Urea | 271.6 | 266.0 | 261.2 | 230.4 | 210.4 | 360.2 | 1,599.8 |
| ⅔ Biuret | 4.0% | 4.8% | 4.7% | 4.6% | 4.2% | 2.6% | |
| ⅓ Urea | 280.4 | 251.8 | 234.6 | 230.4 | 228.0 | 348.2 | 1,573.4 |
| ⅓ Biuret | 4.0% | 4.6% | 4.5% | 4.2% | 4.1% | 2.6% | |
| ⅔ $NH_4NO_3$ | 278.4 | 251.0 | 244.0 | 245.6 | 230.2 | 329.0 | 1,578.2 |
| ⅔ Biuret | 4.3% | 4.4% | 4.0% | 4.1% | 3.9% | 2.7% | |
| ⅓ $NH_4NO_3$ | 281.6 | 258.0 | 247.0 | 249.2 | 244.6 | 318.8 | 1,599.2 |
| ⅓ Biuret | 4.1% | 4.7% | 4.6% | 4.7% | 3.9% | 2.8% | |
| ⅔ $(NH_4)_2SO_4$ | 270.4 | 244.2 | 248.1 | 230.6 | 234.0 | 320.0 | 1,547.3 |
| ⅔ Biuret | 4.3% | 4.6% | 4.2% | 4.2% | 4.1% | 2.8% | |
| ⅓ $(NH_4)_2SO_4$ | 271.6 | 240.0 | 244.0 | 221.6 | 228.4 | 337.0 | 1,542.6 |
| All Biuret | 3.2% | 3.9% | 4.6% | 4.7% | 4.7% | 3.2% | |
|  | 201.6 | 261.0 | 262.8 | 250.4 | 239.6 | 334.8 | 1,550.2 |

The above data show that the fertilizer compositions of this inventon can be effectively employed to achieve a relatively uniform and equal nitrogen release over the growing period. Although the use of the biuret product alone led to a slower nitrogen release during the first two months, the total release over the ten month period was substantially the same as with the other six nitrogenous fertilizer mixes. The preferred agricultural fertilizers are those which contain a rapidly available, and relatively less expensive nitrogen source such as urea, ammonium nitrate or ammonium sulfate; and a slowly available nitrogen source such as the biuret product of this invention.

In order to test the availability of the nitrogen in these new fertilizers and to determine the relative completeness of nitrogen utilization, the following experiments were conducted.

Two gallon flower pots, prepared as described in the previous experiments, were sown with ten barley seeds per pot. After a fortnight, the pots were thinned to leave five plants. Twenty pots were so treated. To four pots each were added 1.0 g. of nitrogen in the form of biuret alone, and 50/50 mixtures of biuret and ammonium nitrate, ammonium sulfate or urea. Four pots were left unfertilized as controls.

The barley plants were grown for three months, and the plants were then removed completely (with roots), and the pots planted with white mustard, which is a good utilizer of residual nitrogen. The white mustard was grown for four months, after which the entire plants were removed. Dry matter, nitrogen content and total nitrogen utilized were then determined in each case. The following results were obtained:

NITROGEN SOURCE

|  | All biuret | ½ biuret, ½ urea | ½ biuret, ½ $NH_4NO_3$ | ½ biuret, ½ $(NH_4)_2SO_4$ | None (control) |
|---|---|---|---|---|---|
| First crop, barley | | | | | |
| Percent germination | 88 | 88 | 90 | 84 | 90 |
| Germination time, days | 7 | 7 | 6 | 6 | 7 |
| Dry matter/pot | 21.6 | 21.8 | 21.4 | 22.6 | 15.0 |
| Nitrogen recovered per pot, mgms | 481.0 | 531.0 | 548.0 | 588.0 | 230.0 |
| Second crop, mustard | | | | | |
| Dry matter/pot | 4.8 | 4.6 | 4.7 | 4.8 | 3.0 |
| Nitrogen recovered per pot, mg | 168.0 | 122.0 | 126.0 | 130.0 | 70.0 |
| Mgms. of Nitrogen totally recovered | 649 | 653 | 674 | 718 | [1] 300 |
| Percent of added nitrogen recovered | 34.9% | 35.3% | 37.4% | 41.8% | |

[1] From nitrogen sources in soil and inoculum.

These results compare favorably with nitrogen recovery of other commercial nitrogenous fertilizers.

To test the nitrification of biuret by soil bacteria, 20 mg. of the biuret were mixed with 100 g. of a good garden soil. Nitrate determinations were made on the soil as a control, and on the mixture (maintained in a pot at ordinary greenhouse conditions) at two week intervals. The increase in nitrate due to nitrification of the biuret indicated the following rates of conversion.

| Weeks: | Percent |
|---|---|
| 2 | 17.8 |
| 4 | 37.0 |
| 6 | 59.8 |
| 12 | 88.0 |
| 18 | 92.6 |

All of these results would seem to indicate that biuret is admixture with rapid-release nitrogenous fertilizers, represents effective slow-release "depot" fertilizer. No toxic effects were observed during the above experiments.

While particular embodiments of this invention are shown above, it will be understood that the invention is obviously subject to variations and modifications without departing from its broader aspects.

What is claimed is:
1. A nitrogenous fertilizer composition containing (a) a slow release nitrogen source comprising biuret free of cyanate ions, and (b) a rapid release nitrogen source.

2. The fertilizer composition of claim 1 comprising 33 to 67% by weight of the slow release nitrogen source and 67 to 33% by weight of the rapid release nitrogen source.

3. The fertilizer composition of claim 1 wherein said rapid release nitrogen source is urea.

4. The fertilizer composition of claim 1 wherein said rapid release nitrogen source is ammonium nitrate.

5. The fertilizer composition of claim 1 wherein said rapid release nitrogen source is ammonium sulfate.

References Cited

UNITED STATES PATENTS

| 2,145,392 | 1/1939 | Harmon | 260—553 |
| 3,057,918 | 10/1962 | Formaini et al. | |
| 3,142,558 | 7/1964 | Beckham et al. | 71—28 X |

S. LEON BASHORE, *Primary Examiner.*

R. D. BAJEFSKY, *Assistant Examiner.*

U.S. Cl. X.R.

71—28; 260—553